UNITED STATES PATENT OFFICE.

BENJAMIN JUMEAUX AND WILLIAM NORMAN LASCELLES DAVIDSON, OF BRIGHTON, ENGLAND.

TRICHROMATIC PHOTOGRAPHY.

No. 814,215.  Specification of Letters Patent.  Patented March 6, 1906.

Application filed February 15, 1904. Serial No. 193,673.

*To all whom it may concern:*

Be it known that we, BENJAMIN JUMEAUX and WILLIAM NORMAN LASCELLES DAVIDSON, subjects of the King of the United Kingdom of Great Britain and Ireland, residing at 20 Middle street, Brighton, in the county of Sussex, England, have invented new and useful Improvements in Trichromatic Photography, of which the following is a specification.

Our invention relates to improvements in trichromatic photography, the objects being to obtain pictures in the natural colors of the articles photographed by the superposition of several positives and also to obtain the required result without the preliminary production of a transparent positive.

In carrying our invention into effect we provide negatives taken through red, green, and blue screens or filters, and from these negatives we print images on sensitized gelatin films, the films being either free or supported on a basis of celluloid, glass, or other suitable material. The films are sensitized by soaking in a solution of a chromate, bichromate, chromic acid, or an acidified solution of bichromate in the manner well known to photographers. The result of exposing the films under the color-record negatives is to harden those portions of the gelatin which are under the transparent parts of the negative. The gelatin films are then washed to remove the excess sensitizing material and to stop further action of the light, which, as is well known, would otherwise continue to act on the sensitized gelatin. The gelatin films are individually soaked in a solution in water of a dye of the complementary color to that of the screen or filter through which the respective negatives have been taken, and the soaking is so prolonged that even the most hardened parts of the gelatin become saturated with the dye. During the saturation the film goes through and passes beyond that stage which would give a positive image, (in the case of a negative being used.) We so saturate or supersaturate the gelatin films with the dye color that the image due to the absorption of color by the softer parts of the gelatin is overpowered by the universal or general absorption of the color. The films are now soaked in water, so that the color washes out of the softest portions of the film and leaves a transparency which is formed by such color as is retained by the hardened portions. Thus a transparency or positive print is obtained instead of a negative. On superposing the stained films thus obtained a picture is obtained in the natural colors of the objects.

Instead of using a transparency for the blue picture we may use a paper-print in blue and superpose the colored films on this, and in thus superposing the prints or transparencies other prints or transparencies may be combined therewith.

What we claim, and desire to secure by Letters Patent, is—

A process for the production of photographs in the natural colors of the objects, and consisting in providing negatives taken through red, green, and blue screens, and printing images therewith onto bichromated gelatin films, which are then supersaturated with solutions of dyes of the complementary colors of the respective screens through which the negatives were taken so that the light-acted-on parts will be the last to take up and the last to part with the dyes when the films are soaked in water, to provide direct positives from the negatives, which positives are then superposed to produce the finished positive in colors, all substantially as hereinbefore described.

In testimony whereof we have signed our names to this specification in the presence of two subscribing witnesses.

BENJAMIN JUMEAUX.
WILLIAM NORMAN LASCELLES DAVIDSON.

Witnesses:
ERNEST H. KEMPE,
A. D. WESTBROOK.